United States Patent Office 3,093,633
Patented June 11, 1963

3,093,633
NOVEL PENICILLIN COMPOUNDS
Donald C. Hobbs, East Lyme, Conn., assignor to Chas. Pfizer & Co., Inc., New York, N.Y., a corporation of Delaware
No Drawing. Filed June 29, 1960, Ser. No. 39,456
13 Claims. (Cl. 260—239.1)

This invention relates to new antibiotic compounds and their salts and, more particularly, to novel 6-aminopenicillanic acid derivatives and their salts which are antagonistic toward gram-positive and gram-negative microorganisms.

The term "penicillin" includes a number of acyl derivatives of 6-amino-penicillanic acid which differ only in the nature of the R group and possess the general formula:

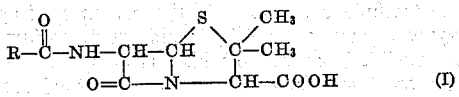

in which the acyl moiety is derived from a carboxylic acid.

The properties of a particular penicillin are determined by the R group. The best known and most widely used penicillins are benzylpenicillin and phenoxymethylpenicillin wherein R (Formula I) represents the benzyl- and phenoxymethyl- radicals. Both compounds are effective via both parenteral and oral administration in the treatment of bacterial infections due to gram-positive organisms but are generally ineffective against gram-negative organisms, many of which are resistant to their action.

There has now been discovered a series of novel and valuable derivatives of 6-aminopenicillanic acid which possess significant activity against gram-positive and gram-negative organisms and which are, therefore, of value in the treatment of various bacterial infections including several due to certain organisms resistant to the presently available penicillins. The novel compounds of this invention have, in the acid form, the formula:

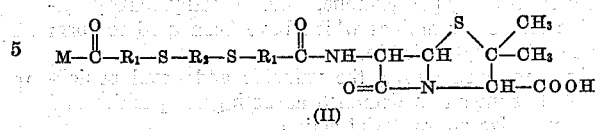

wherein M is selected from the group consisting of hydroxy, alkoxy containing 1 to 4 carbon atoms, amido, carboxymethylimido, carboxyethylimido and carboxyethylideneimido; $R_1$ is selected from the group consisting of methylene and ethylidene; $R_2$ is selected from the group consisting of cycloalkylene containing 4 to 6 carbon atoms, phenylene, 2,5 - thienylene, 2- carboxy - 3,4 - thienylene, methylene and substituted methylene wherein the substituent is selected from the group consisting of carboxy, and halogen; alkylene containing 2 to 4 carbon atoms which may be unsaturated and substituted derivatives thereof wherein the substituent is selected from the group consisting of hydroxy, carboxy, halogen and alkanoyloxy radical of a hydrocarbon carboxylic acid containing 1 to 4 carbon atoms. Many of these novel compounds can, by virtue of the asymmetric centers present in the side chain, exist in diastereoisomeric forms, and mixtures thereof, derived respectively from the isomeric precursor acids. When the dl-precursor acid is used, a mixture of the diastereoisomers will be produced. Moreover, when $R_2$ is asymmetrical, two isomeric structures are possible for a given value of $R_2$; one in which the substituent responsible for the asymmetry is located closer to the nucleus than in the corresponding isomer. Therefore, included within the purview of this invention are the various stereoisomeric modifications and mixtures thereof, of the compounds of Formula II above, all of which exhibit substantial therapeutic activity.

Also included in the present invention are the pharmaceutically acceptable salts of these novel and valuable

TABLE I.—ANTIBACTERIAL SPECTRA (MCG./ML.) OF THE POTASSIUM SALTS OF SEVERAL COMPOUNDS OF FORMULA II

| Organism | 1 | 2 | 3 | 4 | 5 | 6 | 7 | 8 | 9 | 10 | 11 |
|---|---|---|---|---|---|---|---|---|---|---|---|
| Staphylococcus aureus | 0.78 | 0.39 | 0.78 | 3.12 | 1.56 | 1.56 | 0.39 | 1.56 | 1.56 | 0.78 | 0.78 |
| Staphylococcus aureus 376 | 100 | 100 | 100 | 100 | 100 | 100 | 100 | 100 | 100 | 100 | 100 |
| Staphylococcus aureus 400 | 100 | 100 | 100 | 100 | 100 | 100 | 100 | 100 | 100 | 100 | 100 |
| Streptococcus pyogenes | 0.045 | 0.39 | 0.39 | 0.78 | 0.09 | 0.39 | 0.09 | 0.09 | 0.02 | 0.02 | 0.39 |
| Streptococcus faecalis | 0.78 | 0.78 | 1.56 | 12.5 | 0.78 | 6.25 | 3.12 | 3.12 | 1.56 | 1.56 | 6.25 |
| Diplococcus pneumoniae | 1.56 | 0.78 | 0.78 | 12.5 | 0.39 | 6.25 | 1.56 | 3.12 | 1.56 | 1.56 | 6.25 |
| Erysipelothrix rhuisopathiae | | 0.39 | | 0.78 | | | | 0.39 | 0.02 | 0.02 | |
| Corynebacterium diphtheriae | 0.39 | 0.39 | 0.19 | 3.12 | 0.39 | 1.56 | 0.39 | 3.12 | 1.56 | 0.78 | 0.78 |
| Listeria monocytogenes | 6.25 | 1.56 | 1.56 | 50 | 1.56 | 12.5 | 6.25 | 12.5 | 6.25 | 6.25 | 0.78 |
| Bacillus subtilis | 0.78 | 1.56 | 0.78 | 3.12 | 0.19 | 3.12 | 0.19 | 1.56 | 1.56 | 1.56 | 6.25 |
| Streptococcus agalactiae | 0.19 | 0.39 | 0.39 | 0.78 | 0.09 | 1.56 | 0.39 | 0.39 | 0.09 | 0.04 | 0.39 |
| Lactobacillus casei | 6.25 | 3.12 | 6.25 | 50 | 3.12 | 25 | 6.25 | 25 | 12.5 | 25 | 12.5 |
| Bacterium ammoniagenes | 0.19 | 1.56 | 0.78 | 0.78 | 0.39 | 6.25 | 0.78 | 6.25 | 3.12 | 6.25 | 0.78 |
| Aerobacter aerogenes | 50 | 25 | 25 | 100 | 12.5 | 100 | 100 | 100 | 100 | 100 | 100 |
| Escherichia coli | 50 | 25 | | 100 | 12.5 | 100 | 12.5 | 100 | 100 | 100 | 100 |
| Proteus vulgaris | 0.78 | 6.25 | 3.12 | 3.12 | 50 | 50 | 12.5 | 50 | 50 | 25 | 6.25 |
| Pseudomonas aeruginosa | 1.56 | 3.12 | 100 | 100 | 100 | 100 | 100 | 100 | 100 | 100 | 100 |
| Salmonella typhosa | 0.78 | 3.12 | 12.5 | 100 | 6.25 | 100 | 3.12 | 100 | 100 | 100 | 1.56 |
| Salmonella gallinarum | 0.78 | | | 25 | | | 100 | 25 | 50 | 12.5 | 100 |
| Salmonella pullorum | 0.39 | 0.78 | 6.25 | 12.5 | 0.39 | 12.5 | 0.78 | 25 | 25 | 6.25 | 3.12 |
| Klebsiella pneumoniae | 1.56 | 3.12 | 12.5 | 50 | 0.78 | 50 | 6.25 | 25 | 25 | 25 | 6.25 |
| Neisseria gonorrhoeae | 0.78 | 0.39 | 0.78 | 6.25 | 0.39 | 6.25 | 1.56 | 3.12 | 1.56 | 1.56 | 6.25 |
| Hemophilus pertussis | 0.09 | 25 | 1.56 | 12.5 | 0.39 | 12.5 | 12.5 | 3.12 | 6.25 | 6.25 | 3.12 |
| Shigella sonnei | 100 | 25 | 50 | 100 | 12.5 | 100 | 25 | 100 | 100 | 100 | 50 |
| Brucella bronchiseptica | 50 | 50 | 100 | 100 | 12.5 | 100 | 100 | 100 | 100 | 100 | 100 |
| Malleomyces mallei | 100 | 100 | 100 | 100 | 3.12 | 100 | 100 | 100 | 100 | 100 | 6.25 |
| Vibrio comma | 50 | 25 | 6.25 | 100 | 6.25 | 100 | 50 | 50 | 25 | 25 | 3.12 |
| Pasteurella multocida | 0.09 | 0.39 | 0.19 | 1.56 | 0.09 | 0.39 | 0.19 | 0.78 | 0.78 | 0.39 | 0.19 |
| Candida albicans | 100 | 100 | 100 | 100 | 100 | 100 | 100 | 100 | 100 | 100 | 100 |
| Sarcina lutea | 0.19 | 0.39 | 0.045 | 0.19 | 0.09 | 0.19 | 0.045 | 0.04 | 0.02 | 0.02 | 0.78 |
| Mycobacterium 607 | 100 | 100 | 100 | 100 | 100 | 100 | 100 | 100 | 100 | 100 | 100 |
| Mycobacterium berolinense | 100 | | 100 | 100 | 100 | 100 | 100 | 100 | 100 | 100 | 100 |
| Streptococcus pyogenes+serum | 0.09 | 0.78 | 0.09 | 12.5 | 0.045 | 0.78 | 0.19 | 0.39 | 0.04 | 0.04 | 0.78 |
| Staphylococcus aureus+serum | 0.78 | 0.78 | 0.39 | 25 | 0.78 | 1.56 | 1.56 | 3.12 | 1.56 | 1.56 | 0.39 | penicillins, that is, non-toxic metal salts such as the sodium, calcium and potassium salts, and non-toxic ammonium and substituted ammonium salts, for example, salts of such non-toxic amines as procaine, dibenzylamine, N,N'-bis(dehydroabietyl)ethylenediamine, N,N'-dibenzylethylenediamine, 1-ephenamine, N-benzyl-β-phenethylamine, 1-methylpentylamine, 4,4'-dimethylbenzhydrylamine and other amines which have been used to form salts with benzylpenicillin.

As mentioned above, the valuable and novel penicillins of this invention demonstrate both gram-positive and gram-negative antibacterial action.

The antibacterial spectra of several of the products of this invention are given in Table I. All compounds are used as their potassium salts.

The particular compounds referred to are listed in Table II.

TABLE II

| Compound | $R_1$ | $R_2$ |
|---|---|---|
| 1 | $-CH_2-$ | $-CH_2-$ |
| 2 | $-CH_2-$ | $-CH_2-CH_2-$ |
| 3 | $-CH_2-$ | $-CH_2-CH_2-CH_2-$ |
| 4 | $-CH_2-$ | $-CH_2-CH_2-CH_2-CH_2$ |
| 5 | $-CH_2-$ | $-CH(CH_3)-CH(CH_3)-$ |
| 6 | $-CH(CH_3)-$ | $-CH_2-$ |
| 7 | $-CH_2-$ | (trans)  |
| 8 | $-CH_2-$ | $-CH_2-CHOH-CH_2-$ |
| 9 | $-CH_2-$ | $-CH(CH_2OH)-CH_2-$ and $-CH_2-CH(CH_2OH)-$ |
| 10 | $-CH_2-$ | $-CH(CH_3)CH_2-$ and $-CH_2-CH(CH_3)-$ |
| 11 | $-CH_2-$ | $-CH(CH_3)-$ |

The valuable products of this invention are remarkably effective in treating a number of gram-positive and gram-negative infections in animals including man. For this purpose, the pure materials or mixtures thereof with other antibiotics can be employed. They may be administered alone or in combination with a pharmaceutical carrier selected on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents or be injected parenterally, that is, for example, intramuscularly or subcutaneously. For parenteral administration they are best used in the form of a sterile aqueous solution which may contain other solutes, for example, enough saline or glucose to make the solution isotonic.

In addition to their activity against such organisms, the compounds of this invention, carboxymethylmercaptomethylmercaptomethylpenicillin, for example, is orally active in the treatment of Salmonella gallinarum infections in chicks.

The new and valuable compounds of this invention are prepared by the acylation of 6-aminopenicillanic acid with the acid anhydride, chloride or bromide corresponding to the desired side chain, for example, the monoacyl chloride of methylene-bis-thioglycolic acid, in the presence of an acid acceptor.

They can also be prepared by the method of Sheehan et al., Journal of the American Chemical Society, 81, 3089 (1959) which utilizes the reaction of D-penicillamine and t-butylphthalimidomalonaldehydate as starting materials for a series of reactions. Substitution of the phenoxyacetyl chloride utilized by Sheehan et al., by, for example, the monoacid chloride of methylene-bis-thioglycolic acid in the reaction sequence produces carboxymethylmercaptomethylmercaptomethylpenicillin potassium salt. The diastereoisomers, or mixtures thereof, of these valuable products are obtained by utilizing the appropriate form, for example the d-, l- or dl-form, of the acid chloride as reactant. The diastereoisomeric mixtures can, of course, be resolved into the individual diastereoisomers by suitable means such as fractional crystallization, selective extraction, or selective precipitation of an insoluble salt of one diastereoisomer in the presence of the other.

It is preferred to utilize the reaction of 6-aminopenicillanic with the appropriate acid chloride or bromide at pH from about 3.0 to about 9.0 and at a temperature of from about 0° C. to about 50° C. A slight excess of the acid halide (up to 10%) is generally used. After the reaction is complete, generally 1 to 5 hours, the product is isolated by conventional methods well known in the penicillin art.

The starting acids, $$HOOC-R_1-S-R_2-S-R_1-COOH$$

are prepared by methods known in the art. One such procedure involves the condensation of the thio acid, $HOOC-R_1-SH$, such as thioglycolic acid, with the dichloro or dibromo derivative of the $R_2$ moiety, for example methylene bromide, in the presence of an alkalizing agent, such as sodium hydroxide or potassium hydroxide. A modified procedure which is also applicable involves the condensation of the cuprous salt of the thio acid, $HOOC-R_1-S-Cu$, with the dihalo substituted $R_2$ moiety. This method is useful for preparing those acids wherein $R_2$ is phenylene.

When the two sulfur atoms are bridged by a single carbon atom, i.e., methylene, ethylidene, carboxymethylene, the compounds can, in many cases, be prepared from the corresponding formyl derivatives, such as formaldehyde, acetaldehyde, glyoxylic acid, and the appropriate mercaptan, for example, thioglycolic acid, according to conventional procedures.

The starting acids thus obtained are converted to the monofunctional derivatives $$MOC-R_1-S-R_2-S-R_1-COOH$$

by conventional methods, such as by reaction of the respective anhydride, prepared by self-condensation of the acid by 1,3-dicyclohexylcarbodiimide, with the appropriate M—H reactant; i.e., methanol, ammonia, glycine. The acid anhydrides, chlorides and bromides are prepared according to conventional methods.

The condensation of 6-aminopenicillanic acid with the appropriate acid $HOOC-R_1-S-R_2-S-R_1-COOH$, in the presence of a carbodiimide, such as 1,3-dicyclohexylcarbodiimide, can also be used to prepare the products of this invention in accordance with known procedures.

Other substituted amides, that is, compounds wherein one or both of the hydrogen atoms of the amido group, represented by M in Formula II, are replaced by alkyl or hydroxyalkyl radicals containing up to 4 or more carbon atoms, phenyl, hydroxyphenyl, carboxyphenyl, tolyl and benzyl, are also antagonistic toward a variety of microorganisms and, hence, effective in treating many infections in animals and man.

In addition to the compounds described herein, analogous and isotelic compounds wherein oxygen replaces sulfur, for example, carboxymethyloxymethyloxymethylpenicillin, also possess similar activity.

When prepared as described above the novel antibiotics are obtained as the sodium or potassium salts. They are readily converted to the acid form by neutralization with a mineral acid, such as sulfuric or hydrochloric acids, or a suitable ion exchange resin and are recovered by extraction of their aqueous solutions with a suitable water immiscible organic solvent.

The acid forms of the novel antibiotics of the present invention are, in turn, easily converted to salts by reaction with a suitable base. Thus, treatment of the desired antibiotic in aqueous solution with ammonium hydroxide produces the ammonium salt. In like manner other salts such as the calcium, magnesium, barium, potassium and sodium, are formed. In addition, amine salts, such as the procaine, dibenzylamine, N,N'-dibenzylethylenediamine, 1-ephenamine and N-benzyl-β-phenethylamine salts, are prepared by reacting a solution of the desired antibiotic in an aqueous or non-aqueous solvent with the desired amine. Alternatively, the amine salts are prepared in aqueous solution by reacting a metal salt of the desired antibiotic, e.g. the sodium salt, with the desired amine salt, for example, the amine hydrochloride salt.

The presence of the one or more carboxyl groups in the side chain, of course, gives rise to the formation of a variety of salts depending upon the number of carboxyl groups present and the equivalents of base employed in salt formation. For example, when $R_2$ is α,β-dicarboxyethyl, —CH(COOH)—CH(COOH)—, any or all of the 4 carboxy groups in the penicillin molecule can be involved in salt formation.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

For the purpose of convenience, general procedures for the preparations of the novel reactants useful in carrying out this invention are given below:

A. Preparation of the Acid Reactants a. Mercaptoacetic acid or, when $R_1$ is ethylidene, α-mercaptopropionic acid, are reacted with the appropriate dibromo compound having the formula, Br—$R_2$—Br, in a 2 to 1 molar ratio with 4 moles of sodium hydroxide present as 1 N sodium hydroxide. The mixture is stirred overnight at room temperature, then washed with ether, acidified and the acid solution extracted with ether. The ethereal solution is dried over anhydrous sodium sulphate, concentrated under reduced pressure and the viscous residue allowed to stand until crystallization occurs.

b. Two moles of mercaptoacetic acid, or α-mercaptopropionic acid, one mole of the dibromo compound, Br—$R_2$—Br, and 4 moles of sodium hydroxide are reacted together in methanol solution. The mixture is refluxed for 5 hours after which it is concentrated and an equal volume of water added. The solution is washed with ether and then extracted with ether at pH 2. The ethereal solution is dried over sodium sulfate, evaporated and the oily residue allowed to crystallize.

c. Two moles of ethylmercaptoacetate, or of ethyl-α-mercaptopropionate, one mole of ethyldibromo acetate, and two moles of metallic sodium are refluxed in benzene for 5 hours. The solution is then cooled, washed with water and the benzene removed by distillation. The residue is saponified with sodium hydroxide solution until the reaction is one phase. It is then acidified and extracted with n-butanol. The butanol extract is dried with anhydrous sodium sulfate then concentrated. The viscous residue crystallizes upon standing.

d. The procedure of b is followed but the oily product is chromatographed on silica gel using chloroform as eluent. The appropriate fraction is crystallized.

Procedure c is useful in preparing those reactant acids wherein $R_2$ contains a carboxy group. Procedure a is used to prepare those starting acids wherein $R_2$ is an unsubstituted alkylene radical. Procedure b is used in instances wherein difficulty is encountered in obtaining a pure product by procedure a. Procedure d is employed for those compounds which fail to give crystalline products when prepared according to procedure b.

B. Acid Chlorides

The acid chlorides are prepared by refluxing the appropriate acid with an excess of thionyl chloride until evolution of hydrogen chloride and sulfur dioxide ceases. The excess thionyl chloride is removed by distillation, the residue taken up in acetone and then evaporated to dryness to complete removal of the excess thionyl chloride.

C. Preparation of the Acid Anhydrides

The acid anhydrides are obtained by reacting the appropriate acid with one equivalent of 1,3-dicyclohexylcarbodiimide in tetrahydrofuran solution. After four hours at room temperature, the reaction mixture is filtered to remove the dicyclohexylurea, the filtrate concentrated and the product allowed to crystallize.

D. Preparation of the Monofunctional Derivatives (Esters, amides and carboxymethyl substituted amides of the starting acids). The monofunctional derivatives listed above are prepared from the appropriate anhydride by reaction with one equivalent of the proper alcohol, amino acid (glycine, α- and β-alanine) or ammonia according to standard procedures.

E. The monofunctional derivatives prepared in D above are converted to their monoacid chlorides according to procedure B.

F. The starting acids bearing an hydroxyl group in the $R_2$ moiety are converted to their acyl derivatives by reaction with the appropriate acylating agent, anhydride or acid chloride, according to conventional procedures.

EXAMPLE I

Fifty millimoles of the acyl chloride of methylene-bis-thio-glycolic acid in 100 ml. acetone is added dropwise to a solution of 50 millimoles of 6-aminopenicillanic acid in 250 ml. of 3% sodium bicarbonate and 100 ml. of acetone at 4° C. The pH is maintained at 7.5–8.0 by the addition of aqueous sodium hydroxide. After one hour, 100 ml. of water is added, the pH adjusted to 7.0 with aqueous phosphoric acid and the mixture extracted with an equal volume of ether. The aqueous layer is retained, adjusted to pH 2.5 with aqueous phosphoric acid and extracted twice with one volume of n-butanol. The combined n-butanol extracts are washed twice with 1/10 volume of water and then extracted with one-half volume of water, sufficient 5 N KOH being added to bring the pH to 6.5. The aqueous layer is freeze-dried to give the potassium salt of carboxymethylmercaptomethylmercaptomethylpenicillin.

EXAMPLE II

A solution of 1 millimole of methylene-bis-thioglycolic acid in 10 ml. of tetrahydrofuran and a solution of 1 millimole of 1,3-dicyclohexylcarbodiimide in 5 ml. of tetrahydrofuran are added simultaneously to a solution of 1 millimole of 6-aminopenicillanic acid in 20 ml. of water:tetrahydrofuran (1:1) containing sufficient sodium bicarbonate to give a clear solution. The mixture is stirred at room temperature for 3 hours, then diluted with water, filtered to remove 1,3-dicyclohexylurea and unreacted 1,3-dicyclohexylcarbodiimide. The filtrate is extracted with 20 ml. of ether, only the aqueous phase being maintained. The aqueous phase is then extracted with 3×50 ml. volumes of n-butanol at pH 2.0 and the combined n-butanol fractions washed once with water. The n-butanol phase is then extracted with 2×50 ml. portions of water, sufficient potassium hydroxide (6 N) solution being added to each portion during extraction to produce an aqueous extract of pH 7.0. The combined aqueous extracts are washed with 20 ml. of ether then freeze dried to give the dipotassium salt of carboxymethylmercaptomethylmercaptomethylpenicillin identical to the product of Example I.

EXAMPLE III

The procedure of Example I is repeated but using the appropriate acid chloride in place of the acid chloride of methylene-bis-thioglycolic acid. The compounds thus prepared are listed in Table I. In each instance, the potassium salt is obtained and M of Formula I represents KO—;

TABLE III

| Method [1] | R₁ | R₂ |
|---|---|---|
| A | —CH₂— | —CH₂—CH₂— |
| A | —CH₂— | —CH₂—CH₂—CH₂— |
| A | —CH₂— | —CH₂—CH₂—CH₂—CH₂ |
| A | —CH₂— | —CH(CH₃)—CH(CH₃)— |
| B | —CH₂— | —CH=CH— |
| B | —CH₂— | trans—  |
| A | —CH₂— | CH₃—CH= |
| A | CH₃—CH= | —CH₂— |
| A | CH₃—CH= | CH₃—CH= |
| A | —CH₂— | (CH₃—CH=)C= |
| A | —CH₂— | —CH(CH₃)—CH₂ [2] |
|  | —CH₂— | 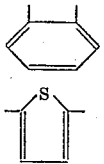 |
| B | —CH₂— | 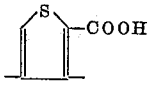 |
| D | —CH₂— | —COOH |
| B | —CH₂— | —CHCl— |
| B | —CH₂— | —CCl₂— |
| B | —CH₂— | —CF₂— |
| B | —CH₂— | —CHBr— |
| C | —CH₂— | —CH(COOH)—CH₂— [2] |
| C | —CH₂— | —CH(COOH)—CH(COOH)— |
| B | —CH₂— | —CH₂—CHCl—CH₂— |
| D | —CH₂— | (CH₃)₂—C= |
| D | —CH₂— | —C(CH₃)=CH— [2] |
| D | —CH₂— | —CH—CH₂ [2] <br> ‖ <br> CH₂ |
| B | —CH₂— | —CH₂—CH=CH—CH₂— |
| C | —CH₂— | —CH(COOH)— |
| D | CH₃—CH= | —CH(CH₃)—CH₂— [2] |
| D | —CH₂— | —CH₂—CHOH—CH₂— |
| D | —CH₂— | —CH₂—CH(CH₂OH)— [2] |
| A | CH₃—CH= | —CH₂—CH₂—CH₂— |
| B | CH₃—CH= |  |
| B | —CH₂— |  |
| B | —CH₂— | —CH(CH₂Cl)— |
| B | —CH₂— | —CH₂—CH(OH)—CH₂—CH₂— [2] |
| B | —CH₂— | CH₃—CH₂—CH₂—CH= |
| B | —CH₂— | —CH₂—CHI—CH₂— |
| B | CH₃—CH= | —CH=CH— |
| B | CH₃—CH= | —CH₂—CHOH—CH₂— |
|  | CH₃CH= |  |
| B | —CH₂— |  |
| B | —CH₂— |  |
| B | CH₂—CH= |  |
| B | CH₃—CH= | —CCl₂— |
| B | —CH₂— | —CH Cl—CH Cl— |
| B | —CH₂— | —CH Br—CH₂— [2] |

[1] The method column refers to the procedure used to prepare the starting acid.
[2] The isomeric compound is also obtained.

EXAMPLE IV

The anhydride of methylene-bis-thioglycolic acid is reacted with 6-aminopenicillanic acid according to the procedure of Example I. The product thus obtained is identical to the product obtained in Example I.

In like manner the potassium salt of carboxyethylidenemercaptomethylmercaptoethylidenepenicillin is obtained from its respective anhydride.

EXAMPLE V

The monoacid chloride of the monomethyl ester of methylene-bis-thioglycolic acid is reacted with 6-aminopenicillanic acid according to the procedure of Example I. The product obtained is the potassium salt of carbomethoxymethylmercaptomethylmercaptomethylpenicillin.

In like manner, the monoesters of the products of Example III are produced from their appropriate monoacid chlorides, prepared according to the procedure of D above. The monomethyl, monoethyl, monopropyl, monoisopropyl, mono-n-butyl and the mono-isobutyl esters are thus prepared.

EXAMPLE VI

Substitution of the monoamides in place of the monoesters in Example V, produces the monoamide derivatives of the products of Example III.

EXAMPLE VII

Following the procedure of Example VI, but using the N-carboxymethyl and the N-α and β-carboxyethyl substituted amides, the corresponding carboxymethylimido, carboxyethylimido and carboxyethylideneimido derivatives of the products of Example III are produced.

EXAMPLE VIII

Following the procedure of Example I but using 2-acetoxy - 1,3 - propylene - bis - thioglycolic acid as acylating agent, carboxymethylmercapto - (2 - acetoxy)propylmercaptomethylpenicillin potassium salt is prepared.

In like manner, the following compounds are prepared:

TABLE IV

| R₁ | R₂ | R₃ |
|---|---|---|
| —CH₂— | —CH₂—CHOR₃—CH₂— | CH₃—C(=O)— |
| —CH₂— | —CH₂—CHOR₃—CH₂— | CH₃—CH₂—C(=O)— |
| —CH₂— | —CH₂—CHOR₃—CH₂— | CH₃—CH₂—CH₂—C(=O)— |
| —CH₂— | —CH₂—CH(CH₂OR₃)— | CH₃—C(=O)— |
| —CH₂— | —CH₂—CH(OR₃)—CH₂—CH₂— | CH₃—C(=O)— |
| —CH₂— | —CH₂—CH(OR₃)—CH₂—CH₂— | CH₃—CH₂—C(=O)— |
| CH₃CH= | —CH₂—CHOR₃—CH₂— | CH₃—C(=O)— |

EXAMPLE IX

The products of the preceding examples are converted to their free acid forms by neutralization of the aqueous solutions of their potassium salts with 6 N hydrochloric acid to pH 2.2. The acids are recovered by extraction into methylisobutylketone followed by evaporation of the solvent.

EXAMPLE X

The free acids of Example VIII are transformed to their sodium, calcium, ammonium, procaine, N,N'-dibenzylethylenediamine, dibenzylamine, 1-ephenamine, N-benzyl-β-phenethylamine, benzimidazole, 2,5-diphenylpiperazine and benzhydrylamine salts by reaction of aqueous solutions thereof with one equivalent of the appropriate base. The salts are recovered by freeze drying.

EXAMPLE XI

The procedure of Example IX is repeated using two equivalents of the above listed bases per equivalent of the penicillin compounds.

EXAMPLE XII

The penicillins of the preceding examples which contain one or more carboxy groups in the $R_2$ moiety are treated with one equivalent of each of the bases of Example X per carboxy group present in the molecule. The products are isolated according to the procedure of Example X.

What is claimed is:

1. A compound selected from the group consisting of compounds represented by the formula:

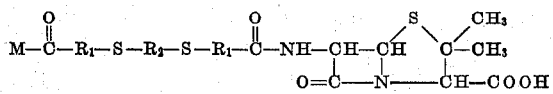

and the pharmaceutically acceptable salts thereof wherein M is selected from the group consisting of hydroxy, alkoxy containing 1 to 4 carbon atoms, amido, carboxymethylimido, carboxyethylimido and carboxyethylideneimido; $R_1$ is selected from the group consisting of methylene and ethylidene; $R_2$ is selected from the group consisting of cycloalkylene containing 4 to 6 carbon atoms, phenylene, 2,5-thienylene, 2-carboxy-3,4-thienylene, methylene and substituted methylene wherein the substituent is selected from the group consisting of carboxy, and halogen; alkylene containing 2 to 4 carbon atoms which may be unsaturated and substituted derivatives thereof wherein the substituent is selected from the group consisting of hydroxy, carboxy, halogen and alkanoyloxy radical of a hydrocarbon carboxylic acid containing 1 to 4 carbon atoms.

2. The compound represented by the formula of claim 1 wherein $R_1$ is methylene, $R_2$ is alkylene containing up to four carbon atoms and M is hydroxyl.

3. The compound represented by the formula of claim 1 wherein $R_1$ is methylene, $R_2$ is unsaturated alkylene containing two to four carbon atoms and M is hydroxy.

4. The compound represented by the formula of claim 1 wherein $R_1$ is ethylidene, $R_2$ is alkylene containing up to four carbon atoms and M is hydroxy.

5. The compound represented by the formula of claim 1 wherein $R_1$ is methylene, $R_2$ is substituted alkylene containing up to 4 carbon atoms wherein the substituent is halogen and M is hydroxy.

6. The compound represented by the formula of claim 1 wherein $R_1$ is methylene, $R_2$ is substituted alkylene containing up to 4 carbon atoms wherein the substituent is carboxy and M is hydroxy.

7. The compound represented by the formula of claim 1 wherein $R_1$ is methylene, $R_2$ is alkylene containing up to four carbon atoms and M is amido.

8. Carboxymethylmercaptomethylmercaptomethylpenicillin potassium salt.

9. Carboxymethylmercaptoethylmercaptomethylpenicillin potassium salt.

10. Carboxymethylmercapto - (α,β-dimethyl)ethylmercaptomethylpenicillin potassium salt.

11. Carboxymethylmercapto - trans - 1,2 - cyclohexylmercaptomethylpenicillin potassium salt.

12. Carboxymethylmercaptoethylidenemercaptomethylpenicillin potassium salt.

13. Carboxymethylmercapto - (β - hydroxy)propylmercaptomethylpenicillin sodium salt.

References Cited in the file of this patent

UNITED STATES PATENTS

| | | |
|---|---|---|
| 2,479,295 | Behrens et al. | Aug. 16, 1949 |
| 2,479,296 | Behrens et al. | Aug. 16, 1949 |
| 2,479,297 | Behrens et al. | Aug. 16, 1949 |
| 2,941,995 | Doyle et al. | June 21, 1960 |

FOREIGN PATENTS

| | | |
|---|---|---|
| 569,728 | Belgium | Nov. 15, 1958 |